United States Patent
Eyberg et al.

(10) Patent No.: US 11,886,900 B1
(45) Date of Patent: Jan. 30, 2024

(54) UNIKERNEL HYPERVISOR FOR MANAGING MULTI-PROCESS APPLICATIONS USING UNIKERNEL VIRTUAL MACHINES

(71) Applicant: NanoVMs, Inc., San Francisco, CA (US)

(72) Inventors: Ian Eyberg, Oakland, CA (US); William Yongwoo Jhun, Tuckahoe, NY (US)

(73) Assignee: NanoVMs, Inc., San Francisco, CA (US)

( * ) Notice: Subject to any disclaimer, the term of this patent is extended or adjusted under 35 U.S.C. 154(b) by 257 days.

(21) Appl. No.: 16/885,138

(22) Filed: May 27, 2020

(51) Int. Cl.
G06F 9/455 (2018.01)
G06F 9/48 (2006.01)

(52) U.S. Cl.
CPC ........ *G06F 9/45558* (2013.01); *G06F 9/4843* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 2009/0138682 A1* | 5/2009 | Capps, Jr. | G06F 11/3466 712/220 |
| 2018/0165110 A1* | 6/2018 | Htay | G06F 8/65 |

OTHER PUBLICATIONS

SnowFlock: Rapid Virtual Machine Cloning for Cloud Computing, Apr. 1-3, 2009, Conference: Proceedings of the 2009 EuroSys Conference, Nuremberg, Germany, pp. 1-12 (Year: 2009).*
KylinX: A Dynamic Library Operating System for Simplified and Efficient Cloud Virtualization, Jul. 11-13, 2018, Proceedings of the 2018 USENIX Annual Technical Conference (USENIX ATC '18), Boston, MA (Year: 2018).*
Kanatsu et al., Running Multi-Process Applications on Unikernel-based VMs, 2017, ACM, https://orum.in/papers/sosp2017-mkanatsu-abstract.pdf (Year: 2017).*
Zhang et al., KylinX: A Dynamic Library Operating System for Simplified and Efficient Cloud Virtualization, Jul. 11-13, 2018, Proceedings of the 2018 USENIX Annual Technical Conference (USENIX ATC '18), pp. 173-185 (Year: 2018).*

(Continued)

*Primary Examiner* — Lewis A Bullock, Jr.
*Assistant Examiner* — Melissa A Headly
(74) *Attorney, Agent, or Firm* — Van Pelt, Yi & James LLP (57) ABSTRACT

Facilitating running a multi-process application using a set of unikernels includes receiving an indication of a request to fork a first process running in a first unikernel virtual machine. It further includes, in response to receiving the indication of the request to fork the process running in the first unikernel virtual machine, deploying a second unikernel virtual machine to run a second process that is a child of the first process.
Unikernel scaling includes determining that a unikernel virtual machine to be deployed is associated with at least a portion of a kernel image that is already cached. It further includes, in response to determining that the unikernel virtual machine to be deployed is associated with the at least portion of the kernel image that is already cached, mapping the unikernel virtual machine to the at least portion of the kernel image that is already cached.

4 Claims, 4 Drawing Sheets

(56) References Cited

OTHER PUBLICATIONS

Cavilla et al., SnowFlock: Rapid Virtual Machine Cloning for Cloud Computing, Apr. 1-3, 2009, Conference: Proceedings of the 2009 EuroSys Conference, Nuremberg, Germany, pp. 1-12 (Year: 2009).*

* cited by examiner

UNIKERNEL HYPERVISOR FOR MANAGING MULTI-PROCESS APPLICATIONS USING UNIKERNEL VIRTUAL MACHINES

BACKGROUND OF THE INVENTION

Unikernels have various benefits that would make them advantageous to run in a variety of situations. However, existing hypervisors are typically optimized for running general purpose operating systems such as Linux or Windows, which are inherently bulkier systems as compared to unikernels.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Described herein is an implementation of a hypervisor (also referred to herein as a "unikernel hypervisor") that is optimized for supporting unikernels. Legacy guest virtual machines typically run full, general-purpose operating systems such as Linux or Windows. Such operating systems are inherently bulkier than unikernels. Unikernels guests, for example only run one program, and typically use fewer resources. However, existing hypervisor solutions, such as Xen or KVM, are designed around running general purpose operating systems. This can be evidenced in settings for existing hypervisors, such as hard-coded limits on the number of guests (e.g., 1024) that can be ran, as there is little consideration that users would run more than 1024 guests. However, if unikernels are treated as a process with a thin virtualization layer, versus an operating system, such existing limits on the number of guests that can be deployed could easily be surpassed.

Consider, for example, web services. Many SaaS (software as a service) websites are powered by web applications, and are composed of many services communicating with each other. With existing systems, a user might deploy, for example, a single Linux server instance with all of their needed Linux services on it (as full guest operating systems are multi-process). This is in contrast to unikernels, which in some embodiments, may be viewed as processes wrapped with a virtualization layer. In the case of unikernels, there would be a virtual machine (VM) instance per process running on the virtual server. Further, the number of unikernels that may be deployed may increase even further if multi-tenant support is provided. For example, if in a previous system, multiple virtual servers are to be hosted, using unikernels, each server instance is multiplied by however many processes would be running on that server.

Existing data centers may already run massive amounts of virtual machines. For example, a bank could have half a million virtual machines that they have to deal with at any given time. With existing systems, a sysadmin (system administrator) or DevOps user would construct virtual machines by spinning up a VM, placing an application inside, and due to software complexity, isolate that VM from other VMs. For example, one VM may have a database in one virtual machine, and a web server in another virtual machine, simply because of the amount of software to be dealt with. In such existing systems, even though only a single application is being run in a virtual machine for isolation purposes, a full-blown guest operating system is implemented. This results in overprovisioning, and means that hardware resource usage is not maximized, and server density is lowered. For example, because the standard or expectation for virtual machines is that full guest operating systems will be run, traditional hypervisors will typically allot a relatively large set of resources, such as RAM, disk, network, memory, number of threads, etc. to accommodate the various processes that a guest operating system might run. Thus, in existing virtualization systems, the minimum system requirements provided by a hypervisor for a VM (e.g., resources and hard limits) are based on the expectation of types of guest installations being run (e.g., Linux guests, Windows guest, other full-blown guest operating systems). This can limit the number of VMs that are typically run on a host server (e.g., only 5-10 VMs on a given host).

However, in such microservice patterns, using unikernels is beneficial, as they would provide the desired isolation due in part to being single process systems. Further, as a unikernel may be considered as a process wrapped in a virtualization layer, rather than a full guest operating system, the minimum system requirements for a unikernel VM instance may be much lower, allowing for increased VM scaling and density with isolation that is not practical in existing virtualization environments.

In addition to such isolation/scaling of VMs, the unikernel hypervisor described herein may be used to facilitate running of multi-process applications using a set of unikernels (where each unikernel is still a single-process system and runs a process in the multi-process application).

Compared to existing hypervisors, using the unikernel hypervisor described herein, guest virtual machines are treated differently from the hypervisor's point of view, where virtual machines are considered as processes, rather than full guest operating systems (which is what existing hypervisors are designed for).

For example, existing hypervisors typically have to expose a hardware interface, such as HVM (Hardware Virtual Machine), as opposed to paravirtualization. Here, the unikernel hypervisor is tightly coupled to the unikernel, and portions of existing hardware-guest kernel interfaces may be bypassed.

As one example, consider the Xen hypervisor. The guest virtual machine can operate at various different levels. For example, a fully hardware virtualized VM may be deployed that has no knowledge of the hypervisor running underneath, and that has no support for paravirtualized devices, Virtio, etc. Rather, the VM expects to find an emulated Intel e1000 as a NIC (network interface controller/card), as well as standard block devices for disk. When the fully virtualized VM boots up, it expects to boot up in the same way as a personal computer (PC), performing BIOS (Basic Input/Output System) calls, discovering physical memory layout using traditional bootloaders, etc.

On the other end of the virtualization spectrum is full paravirtualization, where an existing hardware interface is not being emulated. Instead, the guest virtual machine instance is built with knowledge that it is running on a hypervisor, where steps that would normally occur, such as memory discovery, hardware initialization, etc. are replaced with a different interface.

For example, existing hypervisors that are designed to deploy VMs running general purpose operating systems expose certain interfaces, either through emulated hardware or paravirtualized interfaces that use hypercalls to support a virtual device. As one example, a typical split for a virtualization system has the hypervisor at the lowest level, and then guest kernel above. The guest kernel is generally opaque to the hypervisor, with little exposed (one exception might be a balloon device which allows guest kernels to reclaim or take unused physical pages, or reclaim them from caches, and provide them back to the hypervisor so that they can be re-distributed among other VMs). Generally, a hypervisor has little knowledge of what processes are running under a guest kernel, or what resources they need, or how those processes communicate with one another. Traditionally, above the kernel there are then various processes, and then those processes are further split into threads.

However, in contrast to the traditional virtualization arrangement described above, the interface/boundary between the hypervisor and guest kernel is more blurred, where in some embodiments, the unikernel hypervisor has some kernel functionality, such that the hypervisor will have insight into what is occurring inside the unikernel.

As will be described in further detail below, the hypervisor-kernel interface of the unikernel hypervisor described herein allows for various performance improvements and enhancements in functionality for unikernel guests.

Thus, in some embodiments, the unikernel hypervisor described herein is more tightly coupled with the guest unikernels, where the unikernel instances are aware that they are running on a hypervisor, and the hypervisor has insight and visibility into the kernels of the unikernel virtual machines. Rather than simply offering resources to opaque binaries that are running in virtual machines, the unikernel hypervisor described herein deploys and instantiates unikernels with insight into what is occurring inside those unikernels.

The unikernel hypervisor described herein is focused on supporting unikernel deployment, in contrast to existing general purpose hypervisors designed to run virtual machines with full general purpose operating systems. In the unikernel hypervisor described herein, the hypervisor has increased control of the hypervisor-kernel interface, providing the hypervisor greater insight into what is occurring in guest kernels, which is in contrast to existing hypervisors (which typically do not have such insight). As will be described in further detail below, the increased interaction between the unikernel hypervisor and guest kernels described herein facilitates various functionality and provides performance enhancements, such as facilitating multi-process applications using unikernels, as well as improved scaling and more efficient bootup of unikernels.

Facilitating Running Multi-Process Applications on a Set of Unikernels

The following is an example of a unikernel hypervisor that is configured to support the running of multi-process applications using a set of unikernels. In this example, for illustrative purposes, the multi-process application to be deployed using unikernels is Postgres (PostgreSQL), a relational database management system (RDBMS) that is a multi-process application. As will be shown below, the hypervisor described herein may be used to facilitate forking and exec'ing of processes running in unikernels. In some embodiments, this includes the scheduling of VM instances that are, in effect, processes. Techniques for coordinating communication among the processes (which are each in their own VM instance) via the hypervisor will also be described in further detail below.

As described above, with the hypervisor-kernel interface of the unikernel hypervisor described herein, there is increased interaction between the hypervisor and guest kernels, where the hypervisor has greater insight into what is going on in the unikernel. Further, the hypervisor has a view to the unikernel virtual machines as processes, and is configured to facilitate communication between unikernel virtual machines accordingly.

For example, if a unikernel virtual machine is considered as a process, then in some embodiments the unikernel hypervisor described herein facilitates multi-process applications by allowing the multiple processes to be deployed among a set of virtual machines (e.g., each VM has a process in the group of processes). As some of the processes may need to communicate (e.g., using inter-process communication (IPC) or shared pages), the unikernel hypervisor described herein is configured to facilitate such communication/coordination between processes via data structures in the hypervisor. That is, rather than have coordination of processes being handled by a kernel of a general purpose operating system, that coordination is moved to the hypervisor (since the processes are each encapsulated in a corresponding unikernel VM).

Using the techniques described herein, facilitating multi-process applications using unikernel virtual machines includes a unikernel hypervisor that is configured to coordinate the various resources that are to be shared among the set of virtual machine instances in which the separate individual processes are encapsulated. As will be described in further detail below, the resource coordination performed by the unikernel hypervisor described herein may be implemented using a variety of mechanisms, such as VM-to-VM inter-process communication (IPC), as well as shared memory/shared pages (that are implemented by the unikernel hypervisor and shared among the set of virtual machine instances).

For example, messages (e.g., in the IPC case) may go on a ring queue (which will ultimately be in shared memory as well). These messages are sent and received between different entities. In the case of shared memory, there is memory shared between the different entities, and whatever modifications are made to that memory are coherent and visible across all of the VMs that are sharing that memory.

VM-to-VM IPC and shared memory are but two embodiments of interfaces provided by the unikernel hypervisor to provide resource coordination among a set of unikernel virtual machines used to implement running of a multi-process application.

In some embodiments, such coordination is facilitated by having some of a guest kernel's internal data structures being shared with the hypervisor level. For example, one unikernel will have its own specific address space, and another unikernel will have its own specific address space, but those two unikernels may need to share a certain set of pages.

In some embodiments, to support such sharing of pages, the unikernel hypervisor described herein allocates space in memory mapped to common spaces that the processes (which are in separate unikernel VMs) can access as well. In some embodiments, the hypervisor uses existing interfaces to provide such functionality, such as the SysV (UNIX System V) shared memory interfaces, POSIX interfaces for performing mmap (memory map operation), etc., which can be simulated without changing the UNIX interface (which would allow unmodified application binaries to run as is in the unikernels). In this way, processes are allowed to perform, for example, a fork to spawn another process, which includes calling up into the hypervisor to dynamically spawn off another unikernel virtual machine instance to run that forked-off spawned process, thereby providing the ability to run multi-process applications using unikernels (despite unikernels being single process systems).

Thus, the unikernel hypervisor described herein has intelligence and logic to coordinate shared resources among a set of different unikernels. As described above, the unikernel hypervisor described herein has visibility into the guest kernels, which may be provided via shared data stores or VM-to-VM IPC. The unikernel hypervisor then controls the coordination of such resources (which would be performed by the guest kernels of general purpose operating systems, and existing hypervisors would not have such functionality). For example, here, the unikernels are configured to export certain kernel objects to the hypervisor. When a fork happens, the hypervisor accesses the exported kernel objects to obtain the information needed to perform cloning for deploying a new unikernel VM in which to run the spawned child process (e.g., by looking at a table of file descriptors exported by a unikernel).

Thus, the unikernel hypervisor described herein goes beyond traditional hypervisors, where VMs are, for all intents and purposes, opaque to the hypervisor, where traditional hypervisors have no expectation that they are going to be coordinating with the kernel running under VMs other than to support hypercalls or to emulate hardware or fault on pages (e.g., to handle traps). Here, in contrast to traditional hypervisors, some kernel data structures are at least shared between the unikernel and hypervisor (i.e., more blurred hypervisor-kernel interface, where the boundary is not as opaque and the hypervisor has more visibility with the kernel, and there is some communication between the kernel and the hypervisor). In this way, by having the kernel expose objects to the unikernel hypervisor that it typically would not with existing hypervisors, the unikernel hypervisor described herein has greater visibility into what is occurring in unikernel virtual machines.

Improved Scheduling

The information provided by kernels to the unikernel hypervisor may also include scheduling information, such as statistics that may be used by the unikernel hypervisor to influence scheduling of guest virtual machines.

The following are examples of scheduling information exposed by a guest kernel to the unikernel hypervisor, which the unikernel hypervisor may then use for providing improved scheduling of virtual machine guests. As one example, typically, a hypervisor may be able to determine, in terms of CPU (central processing unit) cycles, how much time a virtual machine is using altogether. Using the techniques described herein, a guest kernel exposes the CPU time that is being used by individual threads (which it typically would not in existing virtualization systems). In addition to CPU time, the kernel also exposes the usage of other resources by individual threads (e.g., memory). For example, under Linux and other operating systems, there is a notion of an "out of memory killer." In some embodiments, the information exported by the kernel to the unikernel hypervisor as described herein can better address such issues, where weight is given to processes that are using too many resources, such that they may be terminated or otherwise restricted before causing out-of-memory issues. This is an improvement over existing hypervisors, which would only be able to determine what resources are being used by a virtual machine as a whole, without granularity or detail at the level of what is capable with the unikernel hypervisor described herein, which is able to observe, for example, what threads are most active or using the most resources. The unikernel is able to utilize such information for the threads of each VM instance that it is deploying.

As one example, by knowing information on an individual thread level basis, when the unikernel hypervisor returns to execute a VM, the unikernel hypervisor provides a hint to the VM, to indicate, for example, that it should schedule another thread, as one thread is using too many resources and is starving out the system. The use of such thread level information also provides the ability to make scheduling decisions at a global level. Such global decision making by the unikernel hypervisor may be performed as desired or on demand. For example, normally, the unikernel hypervisor returns the VM and allows the VM to perform its own scheduling. However, for certain situations, such as when system performance is suffering (e.g., a thread is using too many resources), rather than simply shutting down the virtual machine, the unikernel hypervisor may instead direct a unikernel to make a certain scheduling decision to address the situation.

As one example, the unikernel influences the scheduling of threads on a VM instance by indicating that, based on information obtained from all guest kernels in the system, that scheduling of a specific thread should be given more weight, or that another thread should be prioritized lower because it is consuming too many resources.

Thus, rather than the scheduler of a guest VM having complete autonomy on what to schedule next, or what to schedule on what CPU, the unikernel hypervisor described herein is able to have influence over what is being scheduled. In some embodiments, the unikernel hypervisor provides hints, but the scheduling is ultimately performed by the scheduler in the kernel. In other embodiments, the scheduling decisions may be more centralized, with the unikernel hypervisor dictating/deciding what threads will be scheduled in each VM instance.

One example way for the unikernel hypervisor to provide the thread scheduling hint is to return to the VM (e.g., after a VM exit due to a hypercall or a trap) and have an exception thrown so that the guest kernel then picks up a message from the unikernel hypervisor that the scheduler then takes into account when making a scheduling decision.

As another example, a table in memory is shared between the unikernel and the unikernel hypervisor (yet another example of the "blurred" interface between guest kernels and the unikernel hypervisor described herein). Through the table, the hypervisor may assign weights to various entities to be scheduled. When the VM makes a scheduling decision, it takes those weights into consideration, where the weights are programmed and populated by the unikernel hypervisor so that the guest kernel can make improved scheduling decisions. In this example, there is shared memory between the guest kernel and the unikernel hypervisor. That is, there are pages that are shared where the content is being shared between the virtual machine instance and the unikernel hypervisor. The shared table provides a mechanism by which guest kernel objects are exposed to the hypervisor, and also a mechanism by which to allow the unikernel hypervisor to provide feedback to the VM instance. Here, the unikernel hypervisor may collect data among multiple virtual machines, and then provide feedback by indicating what threads should be weighted to run more and/or what threads should be run less.

As one example, suppose that the unikernel hypervisor determines, based on the guest kernel objects exposed via the shared pages, that a particular thread is consuming a disproportionate amount of CPU time. Based on this information, the unikernel hypervisor may then determine that the particular thread should be prioritized lower (so that it is run less). This may be indicated, for example, by assigning the particular thread a priority of −1 (or any other type of value or indicator of de-prioritization, as appropriate). Another thread, which has been starved out, may then be assigned a priority of +1 so that it will be weighted to run more. This is transparent to the virtual machine instance. When the virtual machine continues to run and the scheduler in the guest kernel is determining whether or not to schedule another thread, the scheduler takes into account those weights populated by the unikernel hypervisor. For example, the scheduler, when computing which thread to run next may observe that the priority for a particular thread is −1, and may prioritize scheduling that thread less when compared to other threads. Thus, in some embodiments, the unikernel hypervisor-provided weight may be used as a factor that is taken into account when a scheduler computes an overall priority upon which to make a scheduling decision.

In one embodiment of the shared table of pages between a virtual machine and the unikernel hypervisor, existing data structures are used. For example, a guest kernel's internal data structures that are normally used for scheduling may be used, with one example difference being that there are some words in the page or structure that are reserved for the unikernel hypervisor to provide feedback for scheduling decisions.

As described above, the unikernel hypervisor receives information from all of the guest virtual machines it is running, and using this global view of thread information, provides the above scheduling coordination with multiple virtual machines or guest kernels (e.g., to influence scheduling decisions made by individual guest kernels). In some embodiments, the unikernel hypervisor has its own internal data structures for aggregating information across kernels, as well as logic to compute (e.g., using heuristics), the weights or other indicators to be provided to guest kernels for influencing or modifying scheduling decisions.

Thus, as described above, there is shared memory between each guest kernel (of each VM instance) and the unikernel hypervisor. The unikernel hypervisor reads information from those data structures, and by evaluating the information received from guest kernels across the system, the unikernel hypervisor determines feedback data that is then fed back into each guest kernel. Here, by sharing kernel data structures between guest kernels and the unikernel hypervisor, decisions that would typically be made all within one kernel are instead distributed across a unikernel and the unikernel hypervisor (an example of a "blurred" kernel-hypervisor interface/boundary/delineation).

In some embodiments, while the unikernel hypervisor has insight into each of the guest kernels, the guest kernels themselves are not aware of each other. That is, a guest kernel in a first virtual machine does not have insight into scheduling information for a guest kernel in another virtual machine. Rather, the guest kernels are isolated from each other (e.g., as if isolating different processes under a single kernel).

While improved thread scheduling using the unikernel hypervisor is described above, improved management of other resources is also provided by the increased insight that the unikernel hypervisor described herein has into what individual kernels are doing with those resources or how those resources are being allocated (e.g., in terms of threads). This greater insight into individual kernels by the unikernel hypervisor (with its "blurred" hypervisor-kernel interface/boundary in which certain kernel objects are exported or otherwise accessible to the unikernel hypervisor, and the unikernel hypervisor is able to provide feedback to the guest kernels) allows for improved decisions to be made about allocation of those resources.

Shared Memory

One aspect of multi-process applications that is handled by the unikernel hypervisor described herein is the coordination of multiple address spaces for multiple processes. For example, threads of a process or a thread group share the same address space, where there is one map or set of mappings that apply to that group of threads. In contrast, individual processes do not share address space unless arrangements have been made to do so, such as by using a shared memory interface. For example, while threads within a same process will share an instance heap, two different processes will have different heaps to use.

As described above, in the case of unikernels, in facilitating running of a multi-process application, each forked/spawned process is encapsulated in its own VM. As will be described in further detail below, in order to facilitate running of a multi-process application using unikernels, the unikernel hypervisor is configured to coordinate the shared memory among the VM instances.

Figure 1:
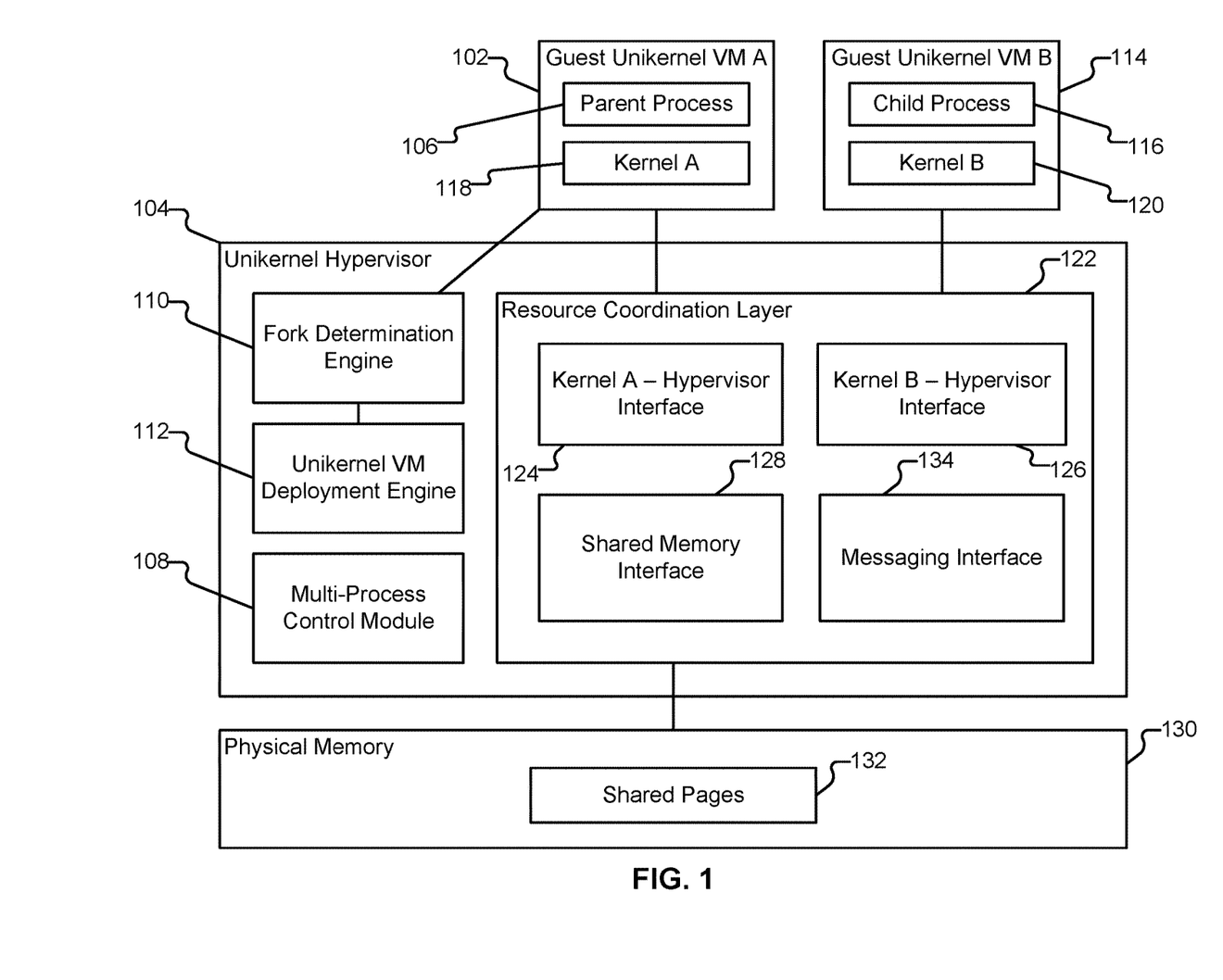
FIG. 1 illustrates an embodiment of a system for facilitating running of multi-process applications using a set of unikernels.

FIG. 1 illustrates an embodiment of a system for facilitating running of multi-process applications using a set of unikernels. In this example, suppose that PostgreSQL is running in guest unikernel virtual machine instance 102, which is being run on unikernel hypervisor 104. In this example, suppose that the PostgreSQL application (running as process 106 in the unikernel VM 102) is written to listen on a socket, and a new connection has come in. Typically, in a traditional VM instance running a general purpose guest operating system, a process is forked off by the application to handle that connection. However, to account for unikernels being single process systems (where a unikernel virtual machine instance is not able to run multiple processes), in some embodiments, in response to the fork request, the unikernel hypervisor spins up and deploys a new unikernel virtual machine instance for the child process to handle the new connection. This is in contrast to a general purpose operating system such as Linux, which would instead simply spin up a new process on the same VM instance.

Here, the unikernel hypervisor is configured to facilitate running of a multi-process application by running the multi-process application on a set of unikernel virtual machines (rather than on a single virtual machine running a general purpose operating system, as done in existing systems). In some embodiments, to allow the capability of running a multi-process application on a set of unikernels (e.g., supporting forking by the unikernel hypervisor), the unikernel hypervisor 104 includes multi-process control module 108 for turning on/off the capability. For example, because an end user would like to run PostgreSQL or some other multi-process application, the end user, via the module, toggles on the option for multi-process capability for a set of virtual machines that are to be used to run the multi-process application (where the virtual machines need not be pre-instantiated, but can be). The end user may load the multi-process capability on demand for different scenarios. For example, the capability may be turned off by default, with the end-user explicitly stating that when provisioning, they would like to turn on the multi-process capability. Thus, end users are provided the option for turning on/off multi-process functionality as needed.

In this example, in response to detecting (e.g., using fork determination engine 110) that process 106 would like to fork, the unikernel hypervisor is configured to, using unikernel VM deployment engine 112, spin up a new VM instance 114 to run a child process 116 to handle the new connection. The following is one example of detecting the fork request using fork determination engine 110. A clone system call is made in unikernel VM instance 102, where the clone system call has parameters indicating that the system call is a fork, where a newly cloned thread is actually a thread belonging to a new thread group/process that has a new associated address space. Typically, in a general purpose operating system, this would happen within a kernel. The kernel creates the new address space, and has a struct to keep track of mappings within the address space. In contrast, in this example, the forking is handled by the unikernel hypervisor. Here, when the fork call is made, a hypercall is made to the unikernel hypervisor. To spawn a child process, the unikernel hypervisor spawns an entire new VM instance to encapsulate the new child process. That is, one running VM instance begets a new VM instance by forking. In this example, a clone system call from the PostgreSQL application goes into the running unikernel VM instance. The unikernel VM instance then does a call into the unikernel hypervisor to affect the fork system call, where the unikernel hypervisor spawns the new unikernel VM instance.

As described above, each process has its own address space. The unikernel hypervisor, as part of spawning a new VM instance, also sets up a new address space. Typically, when there are multiple processes that are running under a kernel, each process will have its own address space identifier (e.g., ASID (Address Space Identifier) for some architectures, PCID (Process-Context Identifier) for Intel, etc.). When address resolution is performed, entries in a TLB (translation lookaside buffer) or TCAM (ternary content addressable memory) will have this identifier. A typical setup for a general purpose operating system is to have the kernel mapped in higher memory. However, lower memory (e.g., user memory) is muxed on that identifier, where for example, each process has a corresponding address space identifier.

In this example, in which individual processes are run on separate unikernels, where each unikernel has its own kernel, there is one address space per unikernel. In some embodiments, the address space includes both kernel and user. There may be a kernel-user privilege separation, but from the viewpoint of the kernel, there is one memory model. As shown in this example, each VM instance 102 and 114 has its own kernels 118 and 120, respectively.

Here, the concept of the unique address space is now elevated to the level of the kernel (and VM instance in this example) rather than the level of the process. For example, analogous to the process address space identifier, the unikernel hypervisor instead identifies address spaces specific to VM instances (which each encapsulate a process). For example, rather than PCID, the unikernel hypervisor uses the VPID (Virtual Processor Identifier) in Intel VT-x. In this example, when the fork occurs and the clone system call is made, the unikernel hypervisor evaluates the clone system call and determines that the application is not attempting to spawn off another thread, but to spawn off another process with a new address space. This calls into the unikernel hypervisor, which creates a new VM instance along with a new VPID (or another type of identifier, as appropriate) to identify the unique address space for the process running in the new VM instance. Each new VM instance will have its own new address space, where every VM has its own different set of mappings. When a new set of mappings is set up for a new VM instance, that set of mappings is associated with a new VPID. In this example, in order to support multi-process capabilities, the unikernel hypervisor causes some pages to be shared (e.g., between the new VM instance and the spawning VM instance), and some portions of page tables may already be prepopulated. For example, as will be described in further detail below with respect to improved scaling of unikernels, a kernel image and user program application image may already be prepopulated for the new VM instance (because a fork of the program is occurring). For example, with respect to the application image, because a fork is occurring and the same application is being run, there is no need to go to the file system to load the program, run the Linux loader, etc. Rather, the unikernel hypervisor is continuing where the parent process is leaving off. Thus, some pages can be shared between the processes or made copy on write. Here, as many pages and common data structures are reused as possible. While there may still remain some degree of overhead for spinning up another VM instance, it is still much less than booting a kernel/file system image from scratch, which would include having to be loaded from disk into memory.

From this point on, the management of that address space is specific to the kernel running in the new VM instance. While the guest kernel of the VM instance is managing the VM's address spaces and page tables, the unikernel hypervisor provides initialization support, as well as coordination when shared memory is requested, which in this case is coordinated by the unikernel hypervisor, since the processes (that will want to communicate among each other) are running in separate unikernel VMs. In some embodiments, this per-VM instance management is provided via kernel-hypervisor interfaces 124 and 126 of resource coordination layer 122.

The following are examples of coordination that the unikernel hypervisor may provide in supporting running multi-process applications on a set of unikernels. In some embodiments, the coordination is performed by resource coordination layer 122. One example of coordination is of the shared memory described above, provided via shared memory interface 128. For example, suppose that a parent process has some pages that it wants to share with a child process. There are various different interfaces to set this up, such as the Sys-V interface and the POSIX (Portable Operating System Interface) interface. In the example of the Sys-V interface, the memory to be shared is allocated and associated with a handle to the shared memory. This handle is transmitted to the child process. The child process can then use the handle when making a system call to access this shared memory. In the Sys-V example, a token is used as a handle. In POSIX, there is a file that is memory mapped.

Thus, there is a handle for some pages, and a parent process may indicate that it wants to be able to share those pages with other processes. The child may then use the handle to request access to those pages and have them added into its own address space.

Typically, the above process of sharing memory between parent/child processes is handled by the kernel. In this case, some of the functionality of a typical kernel is elevated to the hypervisor-level, where the unikernel hypervisor is aware of the discrete address spaces that may be shared, and is also aware of the handles used to identify those pages to be shared.

As one example, suppose that a parent process running in a parent VM instance 102 is going to memory map (mmap) a file. The file is at a known location. Suppose that the file includes a configuration file and a constant. When that file is mapped using the flag MAP SHARED, changes to that file will be reflected in the mappings of other processes that have mapped the same file with MAP SHARED. In this case, the file itself is the handle for the shared memory area. If the parent process 106 writes to that shared space (e.g., shared pages 132 of physical memory 130), then child process 116 will also see that write, and vice versa.

When the child process starts up, the child process will indicate that it would like access to the shared store. The child process will also mmap the file with the MAP SHARED flag. If that succeeds, then a pointer will be returned to the virtual address of that mapping.

In some embodiments, the unikernel hypervisor includes a shared data structure that is shared between the unikernel hypervisor and guest kernels running the unikernel virtual machine instances. In some embodiments, only the unikernel hypervisor is able to write in this space. In some embodiments, the unikernel hypervisor includes a search tree that associates offsets within the file being shared to actual physical pages. However, it is not necessarily the case that when the shared mapping is established or otherwise set up that all of those physical pages would be there. This may be due to demand paging, where pages are allocated on demand. For example, the parent process may map this configuration file. The file has a handle. The shared space may have a large address space; however, none of it may be being used initially. The child process will then also set up a mapping (again, there may not be any physical pages assigned to this space). However, once a process tries to access any of that shared space, a page fault will occur. In a traditional system using a general purpose guest operating system, a physical page would be allocated and a mapping set up in the page fault handler. The page fault handler would then return to the application. The application would then be able to complete the memory transaction.

However, in this example case, where processes are encapsulated in individual processes, and the shared space is shared among VM instances, coordination is performed by the unikernel hypervisor. The coordination allows for accesses to memory shared among processes in different virtual machine instances to resolve to the correct address in the shared memory space. For example, the parent process sets up the mapping. The child process sets up the mapping as well, but when one of the parent and child processes attempts to access a page that doesn't exist yet, the physical page needs to be allocated and installed in the corresponding page table. This access will need to be visible from the other process as well. The other process will page fault, but the guest kernel does not allocate a page and then install it. Instead, the process asks the unikernel hypervisor whether the hypervisor has a page for the process. In this example, the page fault is propagated up to the unikernel hypervisor level. This request may be made via a call into the unikernel hypervisor. As another example, the unikernel hypervisor may be able to determine the request via a table or other data structure that is shared between a guest kernel and the unikernel hypervisor. If the memory to be accessed has not yet been allocated and does not exist, that portion of demand paging may be served by the unikernel hypervisor, where once the page is allocated and installed, the guest kernel of the VM instance that encapsulates the process that requested access to the page is made aware of the page being available.

In some embodiments, there is a delineation between the memory that is shared among the hypervisor and guest kernels and used to provide a function, but that is not shared with the user space, and memory that is shared between one user address space and another user address space existing in another kernel. In some embodiments, a zero copy interface is provided such that a user page with data in it can be shared directly between processes.

Messaging Interface

As described above, coordination of access to shared memory that is shared memory among the virtual machine instances is facilitated by the unikernel hypervisor. In some embodiments, the coordination layer of the unikernel hypervisor is also configured to coordinate messaging among the set of VMs encapsulating the processes of the multi-process application. In some embodiments, messaging coordination is provided by messaging interface 134. For example, VM-to-VM IPC is one example of an interface provided by the unikernel hypervisor to coordinate resources among a set of unikernels used to run a multi-process application.

The following is an example of the unikernel hypervisor using a messaging interface to coordinate resources among a set of unikernel virtual machine instances used to implement a multi-process application. A process generates a message of a certain size with a certain payload. The process then makes a system call. In a typical general purpose operating system running in a guest VM, the message is then sent to another process in the same VM instance. Here, as the processes are not all in a single virtual machine instance, but distributed in different unikernels, in one example embodiment, the message passing is implemented through a ring buffer or ring queue that is in some shared pages. Similar to device drivers for a network interface controller (NIC), a ring of descriptors exists in some allocated memory, where that memory, and the bus address of that memory, are made available to the device. The ring descriptors are filled in, and once enqueued, a signal is generated, or a register is written, to indicate that a message has been posted to the ring buffer so that the device can know to use that data. A similar interface is provided by the unikernel hypervisor to exchange messages among unikernel virtual machine instances.

As one example, a message is created. The message queue also has a handle. This message queue may be created via a system call to a guest kernel of a unikernel instance. As this message may reach outside of the process (and to another unikernel VM instance), the guest kernel informs the unikernel hypervisor that such a message queue has been created. At a later time, the child process will attempt to open up this message queue using the common handle. Several different interfaces may be provided to support this functionality. In the case of the message queue, in one embodiment, the message queue is opened, a file descriptor is used to access the message queue, and then the messages may be read off of the message queue.

The child process may add that file descriptor and use it to loop through waiting and handling events. The parent process may form a message that indicates that there is a new connection, and fill in the appropriate data and ship off that message. The child process then reads the message atomically and acts in response to the contents of the message.

Thus, as described in the example above, shared ring buffers at the unikernel hypervisor level provide a mechanism by which to coordinate resources and communication between unikernel VM instances. The ring buffer message queues may be unidirectional or bidirectional.

The messaging interface may be used to have a child process handle an asynchronous task, such as handling a connection request. Other examples of activities that can be coordinated by the ring buffers at the unikernel hypervisor level including flushing out buffers to disk. Thus, using the hypervisor resource coordination techniques described herein, messages may be formed to provide commands from a parent process to a child process, where the child may also use a message to provide an indication of status (e.g., on completion of a job), which is sent back to the parent process.

Synchronization/Locks

In some embodiments, the unikernel hypervisor also facilitates synchronization amongst the set of VMs encapsulating the processes of a multi-process application. For example, Linux has futexes, which are a type of lock. The futexes are memory locations, where handles to the futexes are memory addresses. In order to facilitate multi-process applications on a set of unikernels, the futexes are placed in shared memory, and are coherent among the virtual machine instances used to implement the multi-process application. There may also be other locks such as mutexes that are accessed via a syscall interface, which are facilitated by the unikernel hypervisor as well.

For locks that are shared among different processes, the unikernel hypervisor is made aware of these locks and their corresponding identifying handles. In some embodiments, operations on locks are implemented through hypercalls to the unikernel hypervisor. In this way, synchronization/lock functionality that is typically resolved through the kernel in general purpose operating systems is elevated into the unikernel hypervisor.

In some embodiments, shared memory locks or futex-type locks work across virtual machine instances via the shared page mechanism described above. For example, suppose that a parent process allocates a futex, which is in a shared mapping that is set up and shared with a child process. In this case, operations on the futex would involve operating on the memory location of the futex, without requiring messaging.

As described above, the unikernel hypervisor supports multi-process applications on unikernels by providing coordination of various resources, which can be provided via messaging (e.g., VM-to-VM IPC), as well as shared memory.

As described above, in some embodiments, lighter weight types of locks or mutexes operate via the shared memory mechanism, without requiring syscalls (although syscalls may be used in futexes to take and release locks, it is via shared memory).

For other types of synchronization, instead of shared memory, a transaction or message may be used to implement locks.

Additional Details Regarding Address Spaces

Address spaces are one example difference between the model described herein and the traditional kernel address space model. In typical kernels, each process has its own address space, and the kernel is providing coordination for sharing memory and message, as well as for other resources such as file descriptors and file system access to a common file system. In contrast, using the techniques described herein, such coordination is facilitated by the unikernel hypervisor (as the processes are not all within one kernel, but associated with different kernels in different unikernel virtual machine instances).

In the traditional kernel model, there is only one kernel address space, with multiple user address spaces. In this traditional kernel model, if there is an exploit at the kernel level, then it is possible that in performing a system call to affect another process, a nefarious attacker could potentially have access to data that is specific to another process, because there is only one kernel address space for both control and data.

However, using the unikernel hypervisor described herein, some of the control operations that would normally be contained in a single kernel are distributed into the unikernel hypervisor. The control operations distributed into the unikernel hypervisor may be limited, for example, to set up the shared memory mappings described above. Having such distribution of control using the techniques described herein provides various security benefits, as it would be difficult for one unikernel to expose to a process what might exist in the address space of a kernel within another virtual machine.

For example, in a traditional general purpose operating system such as Linux, suppose that there is an exploit in shared memory or IPC that allows a nefarious entity to read kernel memory. In this case, that entity would have access to protected data of other processes. Consider, for example, a Docker system, where Linux installations have namespaces that are being used to separate administrative realms. In this case, trust is being placed in kernel code to provide a barrier between these different processes and not only their user address spaces, but whatever data may exist in the kernel or kernel data structures, which is shared among all of the processes and name spaces. The model described herein makes such attacks difficult, as in some embodiments, the data side is not exposed by the guest kernels to the unikernel hypervisor. For example, even with message queues and IPC, the data would exist within some shared mapping between processes that are already collaborating (and are probably part of the same application already). In the model described herein, the unikernel hypervisor does not need to access such data, and instead needs only to make arrangements for the resources to be shared.

Thus, the model described herein provides various security benefits, as not only are user address spaces separated, but kernel address spaces are also separated (because each process in a different VM, and each VM has its own kernel space). In some embodiments, each unikernel has a single flat address space. While it is not required, in some embodiments, there is also a kernel-user split within that single flat address space, as this feature may provide various security benefits, without much additional cost to implement.

This is in contrast to a Linux server using namespaces deploying containers. In this case, there is only one kernel address space, and an exploit in the kernel means that anything that is accessible by that kernel (e.g., all of memory, kernel data structures, memory in other process address spaces) is available. Thus, the attack surface is huge, whereas even if a single unikernel were to be exploited, an attacker is limited given the capabilities and constraints applied at the level of the unikernel hypervisor.

By spawning a new VM instance to encapsulate a child process when performing forking, the kernel address space is, in effect, being bifurcated. Thus, anything that might touch sensitive application data at the kernel level is being isolated. In this model, there is not one single kernel that is managing sensitive data for different administrative entities. This is in contrast to existing general purpose operating systems, where when fork occurs, while there may be some protection with separate user spaces, there is still only one kernel address space, and flaws in the kernel could allow sensitive data to leak between different processes or even different namespaces. Such leaking of data is difficult using the techniques described herein.

Figure 2:
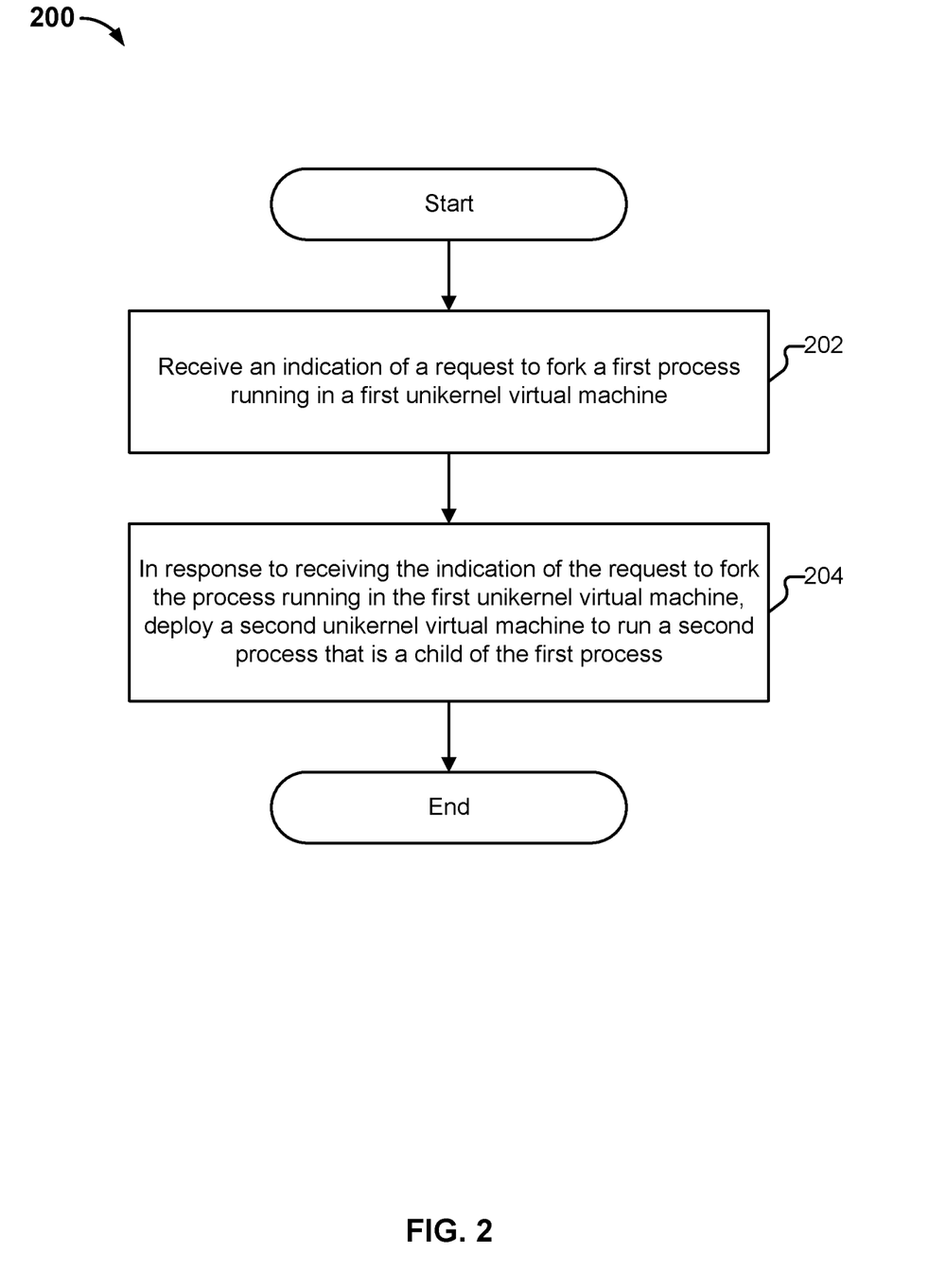
FIG. 2 is a flow diagram illustrating an embodiment of a process for facilitating running of multi-process applications using a set of unikernels.

FIG. 2 is a flow diagram illustrating an embodiment of a process for facilitating running of multi-process applications using a set of unikernels. In some embodiments, process 200 is executed by unikernel hypervisor 104. The process begins at 202 when an indication is received of a request to fork a first process running in a first unikernel virtual machine.

At 204, in response to receiving the indication of the request to fork the process running in the first unikernel virtual machine, a second unikernel virtual machine is deployed to run a second process that is a child of the first process.

As described above, in some embodiments, the hypervisor facilitates running a multi-process application on a set of virtual machines (e.g., that includes the first and second unikernel virtual machines) by performing resource coordination, such as supporting/implementing shared memory and messaging between the virtual machines that each encapsulate a process of the multi-process application, as described above.

Figure 4:
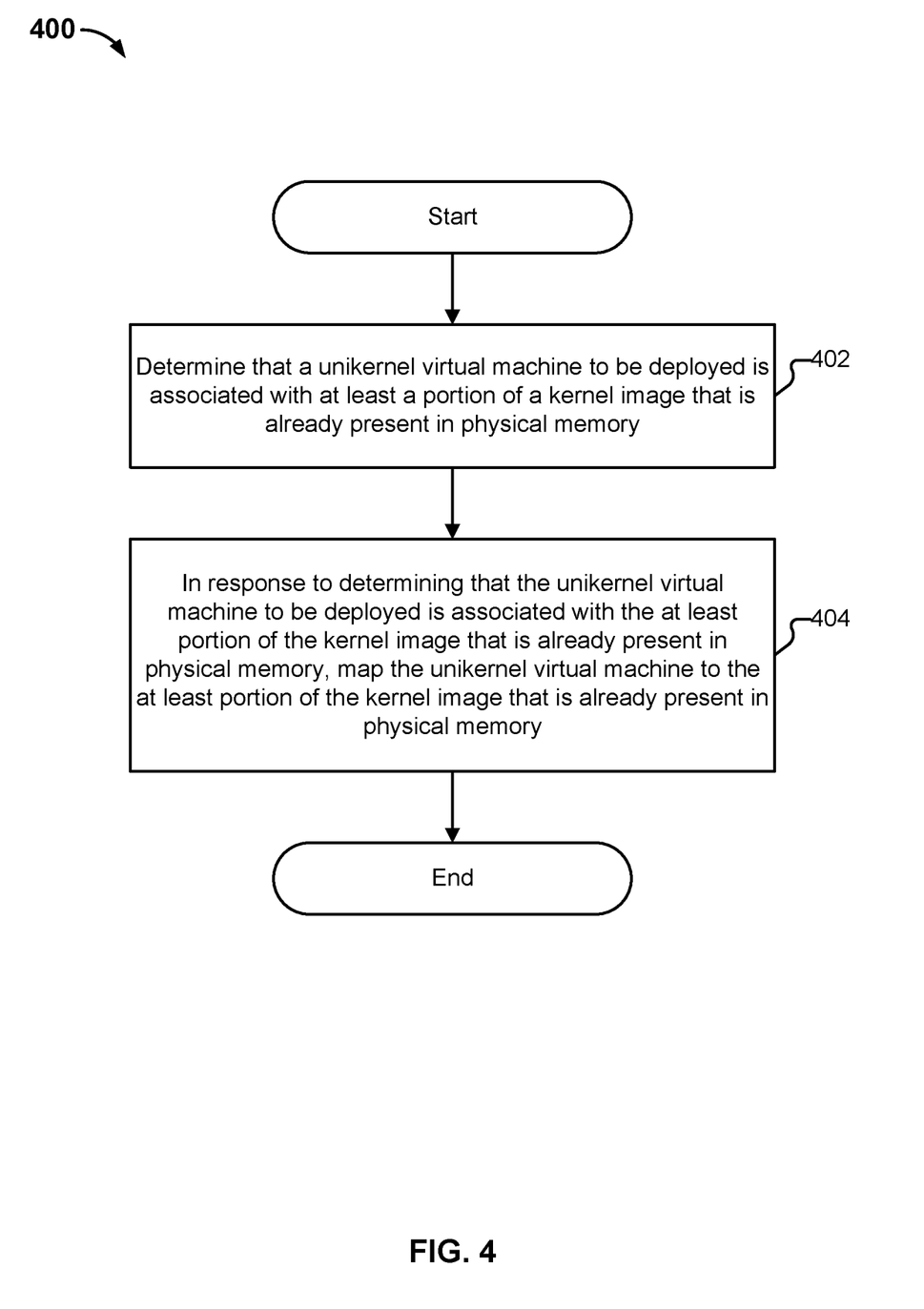
FIG. 4 is a flow diagram illustrating an embodiment of a process for scaling of unikernels.

In some embodiments, deployment of the second virtual machine is sped up by using process 400 below, which will be described in further detail.

Unikernel Scaling

As will be described in further detail below, using the unikernel hypervisor described herein, which is designed for virtual machines that are processes wrapped in a thin virtualization layer (rather than general purpose operating systems), improved scaling/density of virtual machines on host servers may be achieved. Further, improved instantiation speed may be achieved. For example, boot time speeds may be lowered by not having to support virtualization of legacy hardware artifacts that add to boot time.

The improved speed of instantiation has various benefits in a variety of contexts and scenarios. For example, speed of live migration of VM instances (e.g., for backup and disaster recovery purposes, migrating to more physical resources, etc.) is faster using the techniques described herein, as the unikernel VMs are smaller compared to those with general purpose OSes, and mappings to cached kernel/application images may be used, which will be described in further detail below. Further, services can be scaled up and down on demand in a more efficient manner, as much smaller existing images would have to be copied over (as compared with having to copy over a VM instance with an entire general purpose operating system). Additionally, new instances for new services can be quickly spun up as needed. One example use case in where these techniques are beneficial are software defined networking scenarios, where VM instances would need to be spun up and down as various services are needed on demand. Such software defined networking cases include providing telecommunication network functions, such as deploying a virtual device to perform a firewall function, or spinning up a virtual LAN (local area network), which may be implemented as guests virtual machine instances that provide a networking related function (e.g., in a larger network). Using the techniques described herein, such on-demand VM instance deployment may be performed more quickly and efficiently, as lightweight unikernel VM instances are deployed for running one function, rather than having to support deployment of a VM with an entire general purpose operating system just to run that function.

The greater paravirtualization of the unikernel hypervisor described herein is advantageous with respect to scaling. For example, suppose that it is known that the same guest kernel is being used (or to be used) across a set of VM instances deployed in a system. Using the techniques described herein, such knowledge may be utilized by the unikernel hypervisor so that it can avoid going through the process of performing booting, loading of a disk image, interpreting a file system in order to extract a kernel, running a bootloader that then loads the kernel ELF (Executable and Linkable Format), performing mapping, etc. when creating a new VM instance. Instead, this process is done once, and in some embodiments, within the unikernel hypervisor alone.

Figure 3:
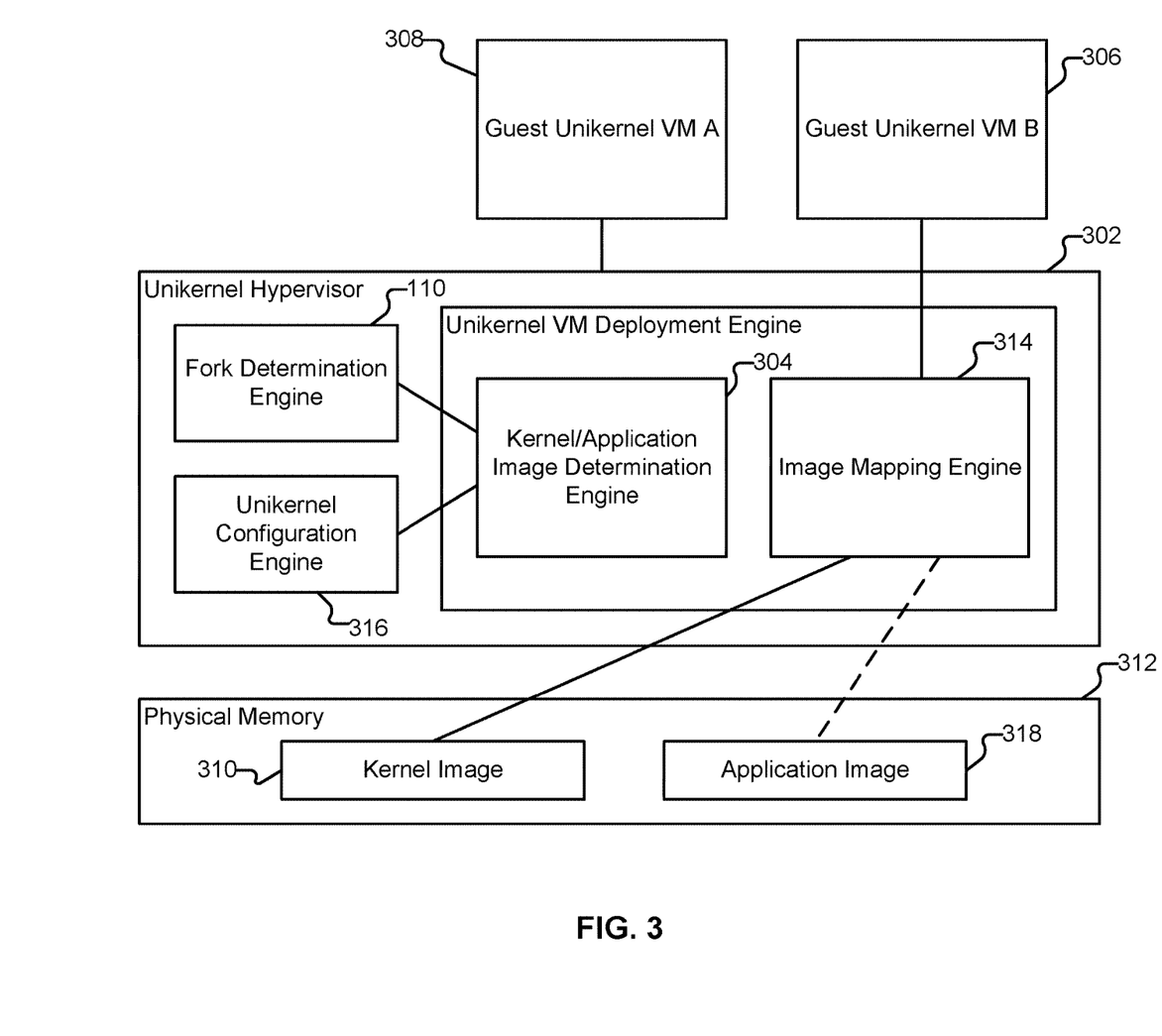
FIG. 3 illustrates an embodiment of a system for scaling unikernels.

FIG. 3 illustrates an embodiment of a system for scaling unikernels. In some embodiments, hypervisor 302 is an alternate view of hypervisor 104. The unikernel hypervisor may determine, in a variety of ways, that a new unikernel virtual machine instance will use the same guest kernel as an existing virtual machine. As one example, if a new virtual machine instance is to be deployed due to a fork, as described above (and which may be detected by fork determination engine 110), then kernel/application image determination engine 304 of the unikernel hypervisor may infer and assume that the new virtual machine instance being spun up (306) is to have the same guest kernel image as the existing unikernel virtual machine instance (308) running the parent process that called for the fork operation. As the guest kernel image 310 for the VM with the parent process is already resident or exists in pages (e.g., in physical memory 312), a new mapping can be set up (e.g., by mapping engine 314) to those pages to start up the new virtual machine instance.

The new guest VM can then begin executing immediately with the kernel image already loaded in memory. For example, the kernel image (including code and data that is packed into an ELF (Executable and Linkable Format) binary that is the kernel) will already be resident in memory. As these are read-only pages, they can be readily shared amongst virtual machines. The following are examples of read-only portions of a kernel image that can be mapped to virtual machine instances (rather than having redundant copies in each VM instances).

For illustrative purposes, consider a kernel image that is an ELF binary. The ELF binary is composed of a number of loadable segments. One segment includes the kernel code itself. This code segment is mapped into memory as read-only (to prevent the kernel code from being written over). The kernel code text segment typically is the largest share of the read-only data. The kernel image also includes read-only data in the form of constants and strings, which may be another set of loadable segments (there may also be multiple sections that belong to a common segment). With respect to segments, an ELF interpreter may be used to evaluate the header of a segment and determine whether to load chunks of data in memory at what address. The sections may be mapped with certain page permissions (e.g., read-only for kernel code text and for certain constants and strings). Such read-only data that would be common/shared across multiple instances (and not specific to any particular instance) may be mapped.

As described above, in the case of ELF binaries, the unikernel hypervisor uses the ELF interpreter to read the headers (e.g., flags in the headers) to determine what portions of the kernel image are read-only. This may be done when the kernel image is loaded by the unikernel hypervisor, which interprets the headers. Such headers may exist in physical memory as file data as it is read off of a block device. Thus, in some embodiments, the first time that the unikernel hypervisor becomes aware of a kernel image (e.g., based on configuration), the unikernel hypervisor loads the kernel image from disk into physical memory. At that point, the unikernel hypervisor interprets the ELF headers to know where loadable segments are and what their permissions are. This would occur the first time that a VM instance is instantiated using a particular kernel image.

At a subsequent time, when there is a fork, or when another instance is being deployed using the same kernel image, that kernel image is already resident in memory, and there is no need to load it again or to go through the ELF loading process. Instead, the unikernel hypervisor sets up, for the new VM instance, mappings to the kernel image that is already loaded in memory.

Not only can the above read-only kernel image information be shared among VMs, but when a new VM instance begins to run, some of the kernel initialization process may already have been completed, where the running VM then completes that initialization process. In some embodiments, in addition to sharing the disk image (which still has to be booted and loaded, and has an image with segments that need to be loaded and mapped), the unikernel hypervisor, because it is aware of what is in the kernel image, sets up and maps all of the pages for the kernel text and data, and prepares a page table that is pre-programmed, so that when it is time to launch the VM, it can simply run (or at least perform less initialization than if starting the boot process from the beginning, as the VM instance may still need to perform set up for devices and initialize its own data structures). Thus, in some embodiments, with the increased interaction between the unikernel hypervisor and guest kernel described herein, the unikernel hypervisor can pre-instantiate certain kernel objects.

In the example of forking, the unikernel hypervisor in effect clones a VM instance in order to spawn a process, somewhat analogous to a traditional general purpose OS (operating system) cloning a process. Using the techniques described herein, read-only pages that cannot be corrupted by a running kernel are reused (in some embodiments, kernel data is not copied in order to maintain an isolation security model). While the new VM instance may still need to perform some instantiation of kernel data structures by itself, in some embodiments, the unikernel hypervisor performs some of the instantiation in advance.

In the above example, the kernel/application image determination engine 304 of the unikernel hypervisor determined that a new unikernel VM instance being deployed will use a same kernel image as one that is already loaded in memory because the new unikernel VM instance is being created due to forking being requested (where if fork is being performed, then the new VM instance is in the same domain as an already running VM instance, and the assumption is that the new VM would be running on the same kernel image as the already running VM instance). In another embodiment, the kernel/application image determination engine 304 determines that a new VM instance being deployed is to be run on an existing kernel image already loaded in memory based on configuration. For example, the unikernel hypervisor may be deploying a new virtual server according to a configuration provided to the unikernel hypervisor by a user via unikernel configuration engine 316, where the user has indicated a disk image that they would like to start, where the disk image may include a kernel embedded within it. The user configuration may also specify a tuple of kernel image (e.g., with a corresponding image identifier), root device image, etc. A unique identifier, e.g., a tuple that includes a kernel release version string, a source control commit identifier (e.g. Git commit hash), a hash (e.g. SHA (Secure Hash Algorithm) sum) of the kernel binary itself, or any combination thereof, may be used to detect identity between two kernel images.

Based on the user configuration provided to the unikernel hypervisor when deploying a new VM instance, the unikernel hypervisor determines that the new VM instance is to run on a kernel image that happens to already be loaded in memory. The unikernel hypervisor then maps the new VM instance to the existing kernel image, as described above.

As shown in the above examples, using the techniques described herein, redundancy has been eliminated by removing those parts of the kernel boot up process that would otherwise be redundant (e.g., read-only parts of kernel images). This speeds up deployment/initialization of new virtual machine instances. Further, the sharing of pages allows for a lower memory footprint (as there are not duplicate copies of the same kernel image being resident in physical memory). The smaller memory footprint allows for higher density of virtual machine instances that may be deployed as well.

This is in contrast to existing hypervisors, and is another example of the "blurred" hypervisor-kernel interface of the unikernel hypervisor described herein. That is, by allowing the hypervisor to have some insight into the running of guest kernel instances (where the boundary between the hypervisor and the guest is less opaque), as well as insight into the image itself, the unikernel hypervisor is able to take shortcuts and spin up a new VM much faster than if the entire boot process were performed.

Not only does the use of cached kernel images using the techniques described herein provide an advantage in terms of boot times, it also provides an advantage in terms of the amount of information and code/text that are shared across VM instances. Both of these advantages will influence density and scaling of virtual machine instances. Further, the use of such cached kernel images across multiple instances also allows for page deduplication and sharing, which is not possible under existing hypervisor implementations.

In some embodiments, in addition to the kernel image being shared, the file system image, depending on what is being deployed, may also be shared among many VM instances. For example, with respect to an application image such as application image 318, if a fork is occurring and the same application is being run, there is no need to go to the file system to load the program, run the Linux loader, etc. Rather, the unikernel hypervisor is continuing where the parent process is leaving off and instead maps application image 318 to the new unikernel VM instances running the child process. Thus, some pages can be shared between the processes or made copy on write. Here, as many pages and common data structures are reused as possible. While there may still remain some degree of overhead for spinning up another VM instance, it is still much less than booting a kernel/file system image from scratch, which would including having to be loaded from disk into memory.

FIG. 4 is a flow diagram illustrating an embodiment of a process for scaling of unikernels. In some embodiments, process 400 is executed by hypervisor 300. The process begins at 402 when it is determined that a unikernel virtual machine to be deployed is associated with at least a portion of a kernel image that is already cached (e.g., present in physical memory). For example, as described above, the unikernel hypervisor may determine that an existing kernel image may be used because the unikernel is to be deployed in order to spawn a child process from a process running in an existing unikernel virtual machine instance (whose kernel image is already loaded in memory) that requested to perform a fork. In other embodiments, as described above, the hypervisor may determine that an existing kernel image in physical memory may be used because a received user configuration for the new virtual machine indicates the use of a kernel image that is already loaded in memory (e.g., because another existing virtual machine instance happened to be using the same kernel image).

At 404, in response to determining that the unikernel virtual machine to be deployed is associated with the at least portion of the kernel image that is already cached, the unikernel virtual machine is mapped to the at least portion of the kernel image that is already cached.

In some embodiments, if it is determined that a fork is being performed, it is also determined that because the new process to be encapsulated in the new VM instance is for the same application being run (as the parent process), then portions of the application image (e.g., read-only portions) that are common to the parent and child process, and that are already resident in memory, may be mapped to the new virtual machine instance being deployed.

In some embodiments, process 400 may be performed as part of performing step 202 of process 200 of FIG. 2, when a new VM instance is to be spun up to run a child process in response to a fork call. Process 400 may be used to speed up booting/initialization of the new unikernel virtual machine.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive, by a hypervisor, an indication of a request to fork a first process running in a first unikernel virtual machine;
in response to receiving the indication of the request to fork the first process running in the first unikernel virtual machine, deploy, by the hypervisor, a second unikernel virtual machine to run a second process that is a child of the first process;
evaluate, by the hypervisor, first thread performance information exported by a first kernel running in the first unikernel virtual machine and second thread performance information exported by a second kernel running in the second unikernel virtual machine, wherein the first thread performance information is exposed to the hypervisor via a set of shared pages that are shared between the first unikernel virtual machine and the (hypervisor;
based at least in part on the evaluation of the first and second thread performance information exported by the first kernel running in the first unikernel virtual machine and by the second kernel running in the second unikernel virtual machine, assign, by the hypervisor, a weight to a thread;
provide, by the hypervisor, the weight assigned to the thread to the first kernel running in the first unikernel virtual machine, wherein the first kernel running in the first unikernel virtual machine is configured to perform thread scheduling based at least in part on the weight provided by the hypervisor,
wherein providing the weight comprises:
populating, by the hypervisor, at least some of the shared pages that are shared between the first unikernel virtual machine and the hypervisor with the weight assigned to the thread; and
executing, by the first unikernel virtual machine, the thread in accordance with the weight assigned to the thread; and
a memory coupled to the processor and configured to provide the processor with instructions.

2. The system recited in claim 1, wherein the first kernel in the first unikernel virtual machine exports the first thread performance information via a kernel data structure exposed to the hypervisor.

3. The system recited in claim 1, wherein deploying the second unikernel virtual machine comprises mapping the second unikernel virtual machine to at least a portion of a kernel image that is already cached.

4. A method, comprising:
receiving, by a hypervisor, an indication of a request to fork a first process running in a first unikernel virtual machine;
in response to receiving the indication of the request to fork the first process running in the first unikernel virtual machine, deploying, by the hypervisor, a second unikernel virtual machine to run a second process that is a child of the first process;
evaluating, by the hypervisor, first thread performance information exported by a first kernel running in the first unikernel virtual machine and second thread performance information exported by a second kernel running in the second unikernel virtual machine, wherein the first thread performance information is exposed to the hypervisor via a set of shared pages that are shared between the first unikernel virtual machine and the hypervisor;

based at least in part on the evaluation of the first and second thread performance information exported by the first kernel running in the first unikernel virtual machine and by the second kernel running in the second unikernel virtual machine, assigning, by the hypervisor, a weight to a thread;

providing, by the hypervisor, the weight assigned to the thread to the first kernel running in the first unikernel virtual machine, wherein the first kernel running in the first unikernel virtual machine is configured to perform thread scheduling based at least in part on the weight provided by the hypervisor, and wherein providing the weight comprises:
  populating, by the hypervisor, at least some of the shared pages that are shared between the first unikernel virtual machine and the hypervisor with the weight assigned to the thread; and executing, by the first unikernel virtual machine, the thread in accordance with the weight assigned to the thread.

\* \* \* \* \*